US012010728B2

(12) United States Patent
He

(10) Patent No.: US 12,010,728 B2
(45) Date of Patent: Jun. 11, 2024

(54) RANDOM ACCESS METHOD AND DEVICE

(71) Applicant: GUANGDONG OPPO MOBILE TELECOMMUNICATIONS CORP., LTD., Guangdong (CN)

(72) Inventor: Chuanfeng He, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 341 days.

(21) Appl. No.: 17/521,387

(22) Filed: Nov. 8, 2021

(65) Prior Publication Data

US 2022/0061105 A1 Feb. 24, 2022

Related U.S. Application Data

(63) Continuation of application No. PCT/CN2019/091413, filed on Jun. 14, 2019.

(51) Int. Cl.
*H04W 74/0833* (2024.01)
*H04W 56/00* (2009.01)
*H04W 72/23* (2023.01)

(52) U.S. Cl.
CPC ..... *H04W 74/0833* (2013.01); *H04W 56/001* (2013.01); *H04W 72/23* (2023.01)

(58) Field of Classification Search
CPC ..... H04W 88/06; H04W 12/06; H04W 60/00; H04W 8/04; H04W 8/08; H04W 8/18;
(Continued)

(56) References Cited

U.S. PATENT DOCUMENTS 11,490,265 B2 * 11/2022 Wu et al. ............... H04W 16/14
11,546,802 B2 * 1/2023 Agiwal et al. ........ H04W 28/20
(Continued)

FOREIGN PATENT DOCUMENTS

CN 103096489 B 6/2016
CN 107371271 A 11/2017
(Continued)

OTHER PUBLICATIONS

Wu (WO 2019184574 A1) >>> Data Transmission Method, and Device and System Related Thereto (see title). (Year: 2019).*
(Continued)

*Primary Examiner* — Meless N Zewdu
(74) *Attorney, Agent, or Firm* — Ladas & Parry, LLP

(57) ABSTRACT

Provided are a random access network device and a device, which can improve the random access performance of a terminal device in an unlicensed spectrum. The network device includes: receiving, by a terminal device, a PDCCH, where the PDCCH includes PRACH resource indication information, the PRACH resource indication information is used for indicating a common PRACH resource scheduled by a network device, the PRACH resource indication information includes at least one of the following information: information of the PRACH resource, information of a synchronization signal block SSB associated with the PRACH resource, and information of a PRACH preamble transmitted on the PRACH resource; and sending, by the terminal device according to the PRACH resource indication information, a PRACH using the PRACH resource.

24 Claims, 7 Drawing Sheets

(58) Field of Classification Search
CPC ......... H04W 4/50; H04W 60/04; H04W 8/24; H04W 76/30; H04W 8/02; H04W 4/60; H04W 12/10; H04W 12/45; H04W 12/43; H04W 12/50; H04W 12/12; H04W 12/30; H04W 8/00; H04W 8/06; H04W 8/20; H04W 8/22; H04W 60/005; H04W 60/02; H04W 88/00; H04W 88/18; H04W 88/02; H04W 88/08; H04W 74/0833; H04W 56/001; H04W 72/23; H04W 74/008; H04W 56/00; H04W 74/00; H04W 74/08; H04M 15/751; H04M 17/103; H04T 2001/111; H04T 2001/113

See application file for complete search history.

(56) References Cited

U.S. PATENT DOCUMENTS

| | | | | |
|---|---|---|---|---|
| 2016/0105908 | A1* | 4/2016 | Li et al. | H04W 74/008 |
| 2017/0332404 | A1* | 11/2017 | Wang et al. | H04W 74/085 |
| 2019/0020461 | A1* | 1/2019 | Yerramalli et al. | H04L 5/1438 |
| 2019/0124697 | A1 | 4/2019 | Tirronen et al. | |
| 2019/0230545 | A1* | 7/2019 | Liou et al. | H04W 24/10 |
| 2020/0413356 | A1* | 12/2020 | Wang et al. | H04W 56/001 |

FOREIGN PATENT DOCUMENTS

| | | | | |
|---|---|---|---|---|
| CN | 107439045 | A | 12/2017 | |
| CN | 109511156 | A | 3/2019 | |
| WO | WO 2019082152 | A1 * | 5/2019 | ............ H04W 74/00 |
| WO | WO 2019/160331 | A1 * | 8/2019 | ............ H04W 56/00 |
| WO | 2020248287 | A1 | 12/2020 | |

OTHER PUBLICATIONS

CN 110167134 A) >>> Synchronous Signal Sending and Receiving Method and Device (see title) (Year: 2019).*

CN 111277378 A) >>> Receiving Method, Information Transmitting Method, Terminal and Network Side Device (see title) (Year: 2020).*

Ericsson, "On initial access, RRM, mobility and RLM," R1-1813459, 3GPP TSG-RAN WG1 Meeting #95, Spokane, USA, Nov. 12-16, 2018, all pages.

Charter Communications, "Feature lead summary #2 of Enhancements to initial access procedure," R1-1903221, 3GPP TSG RAN WG1 Meeting #96, Athens, Greece, Feb. 25-Mar. 1, 2019, all pages.

ZTE, Sanechips, "Discussion on enhancement of initial access procedures for NR-U", R1-1905952, 3GPP TSG RAN WG1 Meeting #97, Reno, USA, May 13-17, 2019, all pages.

CATT, "Further issues with switching of bandwidth part and random access", R2-1806991, 3GPP TSG-RAN WG2#102, Busan, Korea, May 21-25, 2018, all pages.

The first Office Action and search report of corresponding Chinese patent application No. 202210089798.6, dated Apr. 7, 2023.

The second Office Action and search report of corresponding Chinese application No. 202210089798.6, dated Jun. 8, 2023.

International Search Report (ISR) dated Mar. 12, 2020 for International Application No. PCT/CN2019/091413, mailed on Mar. 12, 2020.

Nokia, Nokia Shanghai Bell. "On Enhancements to Initial Access Procedures for NR-U", R1-1906648, 3GPP TSG RAN WG1 Meeting#97, May 3, 2019(May 3, 2019), entire document.

OPPO. "Channel access procedures for NR-U", R1-1810958; 3GPP TSG RAN WG1 Meeting#94bis, Sep. 29, 2018(Sep. 29, 2018), entire document.

3GPP TS 38.212 V15.2.0 (Jun. 2018); 3rd Generation Partnership Project; Technical Specification Group Radio Access Network; NR; Multiplexing and channel coding(Release 15), entire document.

Written Opinion of the International Searching Authority in International Application No. PCT/CN2019/091413 mailed on Mar. 12, 2020 with English translation provided by Google Translate.

* cited by examiner

RANDOM ACCESS METHOD AND DEVICE

CROSS-REFERENCE TO RELATED APPLICATION

This application is a continuation of the International application PCT/CN2019/091413, filed on Jun. 14, 2019, entitled "RANDOM ACCESS METHOD AND DEVICE", the content of which is hereby incorporated by reference in its entirety.

TECHNICAL FIELD

Embodiments of the present application relates to the field of communication and, in particular, to a random access method and a device.

BACKGROUND

In a 5G system or a new radio access technology (New Radio Access Technology, NR) system, data transmission on an unlicensed spectrum is supported. In an NR-based access to unlicensed spectrum (NR-based access to unlicensed spectrum, NR-U) system, a terminal device and a network device need to perform signal transmission based on the principle of listen before talk (Listen Before Talk, LBT). That is, before the signal is sent, it is necessary to perform channel listening first. The signal can only be sent when a listening result is that a channel is idle, but cannot be sent when the listening result is that the channel is busy.

The network device can configure a semi-static physical random access channel (Physical Random Access Channel, PRACH) resource for the terminal device to perform random access on the unlicensed spectrum. However, since the terminal device may suffer from an LBT failure, the terminal device cannot send a PRACH on a scheduled PRACH resource, thus affecting the random access performance of the terminal device.

SUMMARY

In a first aspect, a random access method is provided, including: receiving, by a terminal device, a PDCCH, where the PDCCH includes PRACH resource indication information, the PRACH resource indication information is used for indicating a common PRACH resource scheduled by a network device, the PRACH resource indication information includes at least one of the following information: information of the PRACH resource, information of a synchronization signal block SSB associated with the PRACH resource, and information of a PRACH preamble transmitted on the PRACH resource; and sending, by the terminal device according to the PRACH resource indication information, a PRACH using the PRACH resource.

In a second aspect, a random access method is provided, including: sending, by a network device, a PDCCH, where the PDCCH includes PRACH resource indication information, the PRACH resource indication information is used for indicating a common PRACH resource scheduled by the network device, the PRACH resource indication information includes at least one of the following information: information of the PRACH resource, information of a synchronization signal block SSB associated with the PRACH resource, and information of a PRACH preamble transmitted on the PRACH resource; and receiving, by the network device, a PRACH which is sent by the terminal device using the PRACH resource.

In a third aspect, a terminal device is provided, the terminal device can execute the method in the above first aspect or any optional implementation of the first aspect. Specifically, the terminal device can include a functional module in the above first aspect or any possible implementation of the first aspect.

In a fourth aspect, a network device is provided, the network device can execute the method in the above second aspect or any optional implementation of the second aspect. Specifically, the terminal device can include a functional module in the above second aspect or any possible implementation of the second aspect.

In a fifth aspect, a terminal device is provided, including a processor and a memory. The memory is configured to store a computer program, the processor is configured to call and run the computer program stored in the memory to execute the method in the above first aspect or any possible implementation of the first aspect.

In a sixth aspect, a network device is provided, including a processor and a memory. The memory is configured to store a computer program, the processor is configured to call and run the computer program stored in the memory to execute the method in the above second aspect or any possible implementation of the second aspect.

In a seventh aspect, a communication apparatus is provided, including a processor. The processor is configured to call and run a computer program to cause a device installed with the communication apparatus to execute the method in the above first aspect or any possible implementation of the first aspect.

The communication apparatus, for example, can be a chip.

In an eighth aspect, a communication apparatus is provided, including a processor. The processor is configured to call and run a computer program to cause a device installed with the communication apparatus to execute the method in the above second aspect or any possible implementation of the second aspect.

The communication apparatus, for example, can be a chip.

In a ninth aspect, a computer-readable storage medium is provided, configured to store a computer program, the computer program causes a computer execute the method in the above first aspect or any possible implementation of the first aspect.

In a tenth aspect, a computer-readable storage medium is provided, configured to store a computer program, the computer program causes a computer execute the method in the above second aspect or any possible implementation of the second aspect.

In an eleventh aspect, a computer program conduct is provided, including computer program instructions, the computer program instructions cause a computer to execute the method in the above first aspect or any possible implementation of the first aspect.

In a twelfth aspect, a computer program conduct is provided, including computer program instructions, the computer program instructions cause a computer to execute the method in the above second aspect or any possible implementation of the second aspect.

In a thirteenth aspect, a computer program is provided, the computer program, when running on the computer, causes a computer to execute the method in the above first aspect or any possible implementation of the first aspect.

In a fourteenth aspect, a computer program is provided, the computer program, when running on the computer, causes a computer to execute the method in the above second aspect or any possible implementation of the second aspect.

In a fifteenth aspect, a communication system is provided, including a terminal device and a network device.

The network device is configured to: send a PDCCH, the PDCCH including PRACH resource indication information; and receive a PRACH which is sent by the terminal device using the PRACH resource.

The terminal device is configured to: receive the PDCCH, the PDCCH including PRACH resource indication information; and send the PRACH using the PRACH resource according to the PRACH resource indication information.

Where the PRACH resource indication information is used for indicating a common PRACH resource scheduled by the network device, the PRACH resource indication information includes at least one of the following information: information of the PRACH resource, information of a synchronization signal block SSB associated with the PRACH resource, information of a PRACH preamble transmitted on the PRACH resource.

DETAILED DESCRIPTION OF EMBODIMENTS

The technical solutions in embodiments of the present application will be described below in conjunction with the drawings.

The technical solutions of the embodiments of the present application can be applied to various communication systems, such as: a global system of mobile communication (Global System of Mobile communication, GSM) system, a code division multiple access (Code Division Multiple Access, CDMA) system, a wideband code division multiple access (Wideband Code Division Multiple Access, WCDMA) system, a long term evolution (Long Term Evolution, LTE) system, an LTE frequency division duplex (Frequency Division Duplex, FDD) system, an LTE time division duplex (Time Division Duplex, TDD), an advanced long term evolution (Advanced long term evolution, LTE-A) system, a new radio (New Radio, NR) system, an evolution system of an NR system, an LTE-based access to unlicensed spectrum (LTE-based access to unlicensed spectrum, LTE-U) system, an NR-based access to unlicensed spectrum (NR-based access to unlicensed spectrum, NR-U) system, a universal mobile telecommunication system (Universal Mobile Telecommunication System, UMTS) system, a wireless local area network (Wireless Local Area Networks, WLAN), a wireless fidelity (Wireless Fidelity, WiFi), a future 5G system or other communication systems, etc.

Generally speaking, a traditional communication system supports a limited number of connections and is easy to implement. However, with the development of communication technologies, a mobile communication system will not only support a traditional communication, but will also support, for example, a device to device (Device to Device, D2D) communication, a machine to machine (Machine to Machine, M2M) communication, a machine type communication (Machine Type Communication, MTC), and a vehicle to vehicle (Vehicle to Vehicle, V2V) communication, etc. The embodiments of the present application can also be applied to these communication systems.

In an implementation, the communication system in the embodiments of the present application can be applied to a carrier aggregation (Carrier Aggregation, CA) scenario, a dual connectivity (Dual Connectivity, DC) scenario, or can also be applied to a standalone (Standalone, SA) deployment network scenario, etc.

Figure 1:
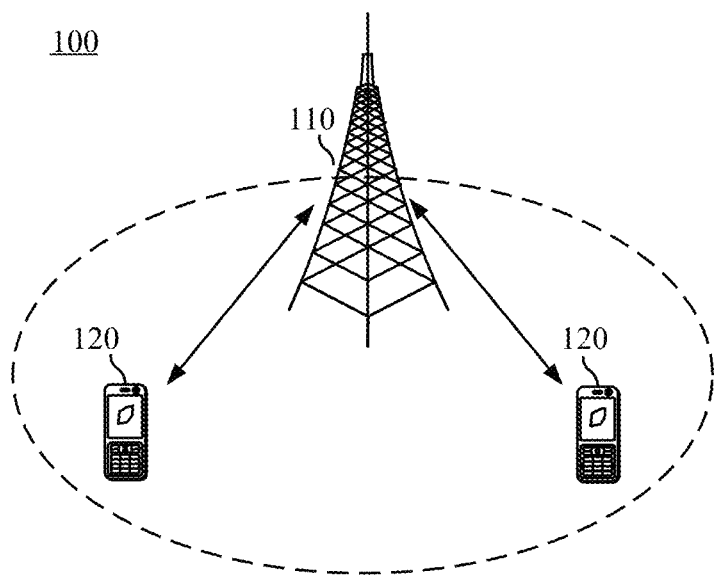
FIG. 1 is a schematic diagram of a possible wireless communication system provided by an embodiment of the present application.

Exemplarily, a communication system 100 of the embodiments of the present application is shown in FIG. 1. The communication system 100 may include a network device 110, and the network device 110 may be a device in communication with a terminal device 120 (or called a communication terminal, a terminal). The network device 110 can provide communication coverage for a specific geographic area, and can communicate with a terminal device located in the coverage area.

In an implementation, the network device 110 may be a base station (Base Transceiver Station, BTS) in a GSM system or a CDMA system, or a base station (NodeB, NB) in a WCDMA system, or an evolutional base station (Evolutional Node B, eNB or eNodeB) in an LTE system, or a wireless controller in a cloud radio access network (Cloud Radio Access Network, CRAN); or the network device 110 may be a mobile switching center, a relay station, an access point, a vehicle-mounted device, a wearable device, a hub, a switch, a bridge, a router, a network side device in a 5G network, or a network device in a future evolutional public land mobile network (Public Land Mobile Network, PLMN), etc.

The wireless communication system 100 also includes at least a terminal device 120 located within the coverage area of the network device 110. Optional, the terminal device 120 can refer to a user equipment, an access terminal, a user unit, a user station, a mobile station, a remote station, a remote terminal, a mobile device, a user terminal, a terminal, a wireless communication device, a user agent or a user apparatus. The terminal device can be a cellular phone, a cordless phone, a session initiation protocol (Session Initiation Protocol, SIP) phone, a wireless local loop (Wireless Local Loop, WLL) station, a personal digital assistant (Personal Digital Assistant, PDA) device, a handheld device with a wireless communication function, a computing device or other processing devices connected to wireless modem, an in-vehicle device, a wearable device, a terminal device in future 5G network or a terminal device in a future evolution public land mobile network (Public Land Mobile Network, PLMN), etc., The embodiment of the present application is not limited to this. Among them, in an implementation, the terminal device 120 can also perform device to device (Device to Device, D2D) communication.

The network device 110 can provides services, the terminal device 120 communicates with the network device 110 thought a transmission resource used by a cell, such as a frequency domain resource or a spectrum resource. The cell can be a cell corresponding to the network device 110, the cell can belong to a macro base station, or can also belong to a base station corresponding to a small cell, the small cell may include: a metro cell, a micro cell, a pico cell, a remto cell, etc., these small cells have the characteristics of small coverage and low transmission power, and are suitable for providing high-speed data transmission services.

FIG. 1 exemplarily shows one network device and two terminal devices, however, the present application is not limited to thereto. The wireless communication system 100 can include a plurality of network devices, and the coverage area of each network device can include other numbers of terminal devices, In addition, the wireless communication system 100 can also include other network entities such as a network controller and a mobility management entity.

An unlicensed spectrum (or unlicensed spectrum) is a spectrum divided by a country and a region that can be used for radio device communication. The spectrum is usually considered as a shared spectrum, that is, communication devices in different communication systems can use the spectrum as long as they meet the regulatory requirements set by the country or the region for the spectrum, and do not need to apply for exclusive spectrum authorization from a government.

In order that various communication systems using the unlicensed spectrum for wireless communication can coexist friendly on the spectrum, some countries or regions have stipulated the legal requirements that must be met when using the unlicensed spectrum. For example, the communication device follows the principle of "listen before talk (LBT)", that is, the communication device needs to listen to a channel before transmitting a signal on an unlicensed spectrum channel, only when a channel listening result is that the channel is idle, the communication device can only send a signal; if the channel listening result obtained by the communication device for the channel of the unlicensed spectrum is that the channel is busy, the communication device cannot send a signal.

A common channel and signal in an NR system, such as a synchronization signal and a broadcast channel, need to cover a whole cell by way of multi-beam scanning, so that it can be received by a terminal device in the cell. Sending a synchronization signal block (Synchronization signal/PBCH Block, SSB, SS Block or SS/PBCH Block) using multiple beams can be implemented by defining a synchronization signal block burst set. An SS/PBCH burst set includes one or more SSBs. An SSB is used for carrying a synchronization signal and a broadcast channel of a beam. Therefore, an SS/PBCH burst set can include SSB number synchronization signals of beams in a cell, where the maximum value L of the SSB number is related to a frequency band of the system. For example, for a frequency range higher than 3 GHz, L=4; for a frequency range from 3 GHz to 6 GHz, L=8; for a frequency range from 6 GHz to 52.6 GHz, L=64.

Figure 2:
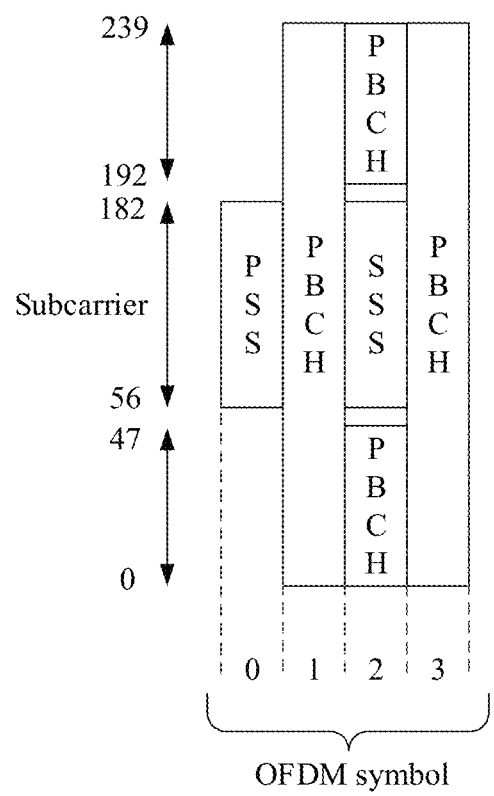
FIG. 2 is a schematic diagram of a structure of an SSB.

Optional, an SSB can include a primary synchronization signal (Primary Synchronization Signal, PSS) and a secondary synchronization signal (Secondary Synchronization Signal, SSS), a physical broadcast channel (Physical Broadcast Channel, PBCH). As shown in FIG. 2, an SSB includes a PSS lasting an orthogonal frequency division multiplexing (Orthogonal Frequency Division Multiplexing, OFDM) symbol, an SSS lasting a symbol and an NR-PBCH lasting two symbols, among them, a time-frequency resource occupied by a PBCH includes a DMRS, the DMRS may be used for demodulation of the PBCH.

All the SSBs in the SS/PBCH burst set are sent within a time window of 5 ms, and can be sent repeatedly according to a certain period. The period can be configured through a higher layer parameter SSB-timing, the period can be 5 ms, 10 ms, 20 ms, 40 ms, 80 ms, 160 ms, etc. For a terminal device, an SSB index of the SSB can be obtained through a received SSB, the SSB index corresponds to a relative position of the SSB in the 5 ms time window. The terminal device can obtain frame synchronization according to the SSB index and half frame indication information carried in the PBCH. Where the SSB index can be indicated through the DMRS in the PBCH or information carried in the PBCH.

Figure 3:
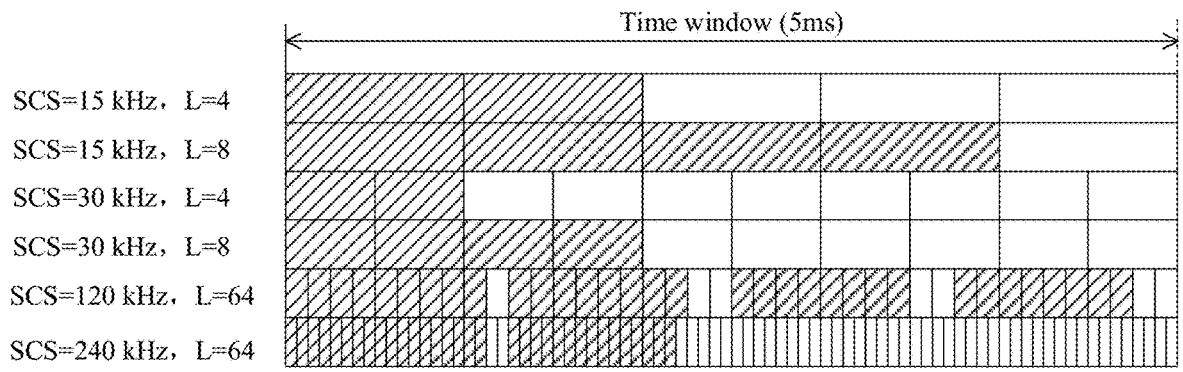
FIG. 3 is a schematic diagram of SSB distribution patterns under different SCS.

FIG. 3 is SSB distribution patterns under different subcarrier spacing (Subcarrier Spacing, SCS), among them, slot distributions of SSBs are different under different subcarrier spacing and frequency bands. For example, as shown in the first row of FIG. 3, in the case of 15 kHz subcarrier spacing, the maximum number of SSBs is L=4. One slot includes 14 symbols, the slot can carry two SSBs. Four SSBs are distributed in the first two slots in the 5 ms time window.

L is the maximum number of SSBs in the time window, and the value range of the SSB index is [0, L-1]. The actual number of SSBs sent can be equal to or less than L. On the one hand, the SSB index is used for frame synchronization, on the other hand, the SSB index is also used for the terminal device to obtain information about a quasi-co-located (Quasi-Co-Located, QCL) relationship of the SSB. When SSB indexes of two SSBs received at different SSB positions are the same, it can be considered that there is a QCL relationship between these two SSBs. When there is a QCL relationship between two reference signals, such as SSBs, or two reference signals are QCL, it can be considered that large-scale parameters of the two reference signals, such as Doppler delays, average delays, spatial reception parameters, etc., can be inferred from each other, or can be regarded as similar. When measuring SSBs, the terminal device can filter SSBs with QCL relationships as a measurement result at a beam level.

In an NR-U system, for a primary cell (Primary cell, Pcell), the network device send a discovery reference signal (Discovery Reference Signal, DRS) used for access and measurement, etc., the DRS at least includes SSB. Considering the uncertainty of obtaining the right of use on the unlicensed spectrum, in the process of sending the SSB, because of the possibility of an LBT failure, the SSB may not be successfully sent at a predetermined time. Therefore, in the NR-U, a plurality of candidate SSB positions are configured for the transmission of the SSB. For example, in a 5 ms time window, 20 candidate SSB positions are configured for the SSB with a subcarrier spacing of 30 kHz. For another example, in a 5 ms time window, 10 candidate SSB positions are configured for the SSB with a subcarrier spacing of 15 kHz. Based on the assumption that the maximum number of SSBs sent by the network device in each time window is Q and the number of candidate SSB positions in each time window is Y, the network device determines, according to the result of LBT in the time window, which Q positions among Y SSB positions are used to transmit the SSB. The Y SSB locations can be agreed by a protocol or configured by the network device.

In this case, the QCL relationship of the SSB and frame synchronization cannot be obtained at the same time by using the SSB index in the NR system, so two sets of indexes are needed to represent the SSB position for transmitting the SSB and the QCL relationship of the SSB respectively, i.e., an SSB position index and an SSB QCL index. That is, the SSB index in the NR system corresponds to the SSB position index and the SSB QCL index in the NR-U system.

Figure 4:
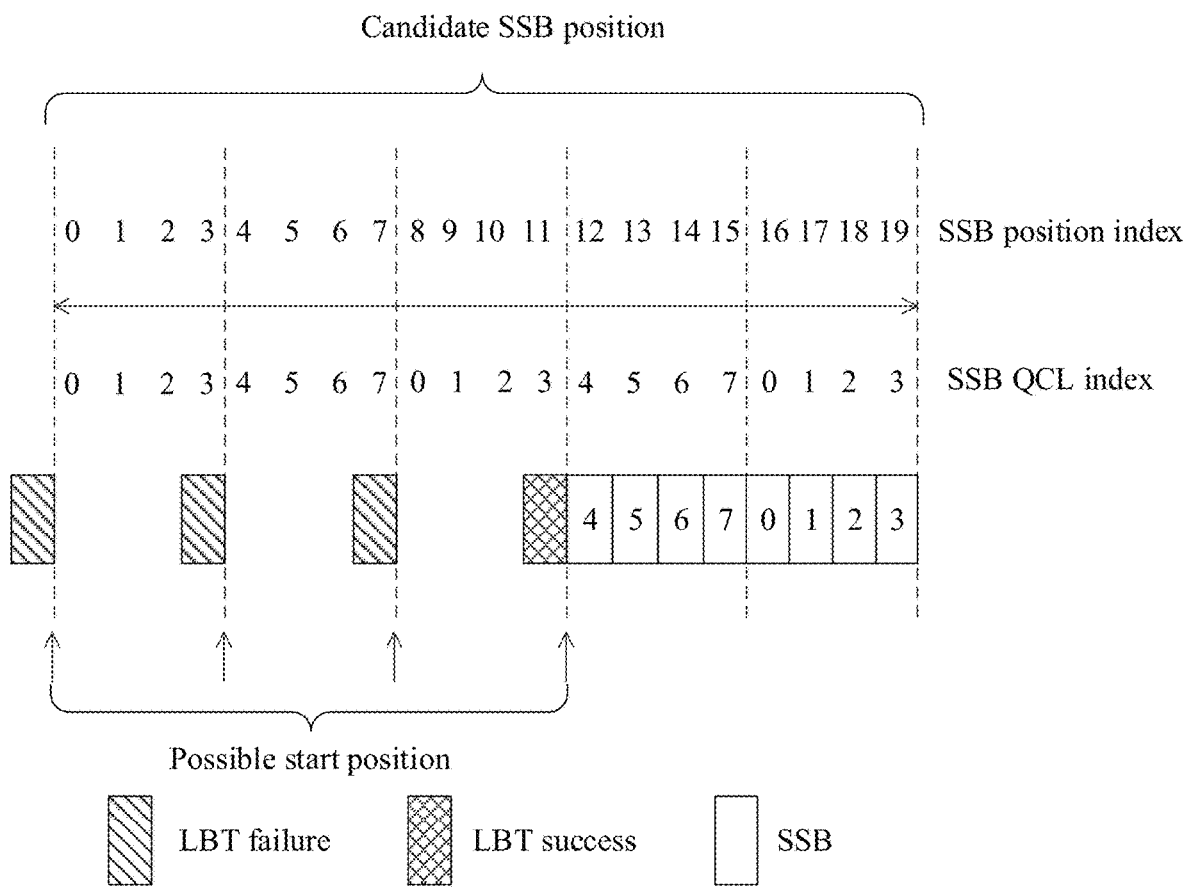
FIG. 4 is a schematic diagram of an SSB position index and an SSB QCL index.

Taking FIG. 4 as an example, it is assumed that Y=20 candidate SSB positions are configured in a 5 ms time window, and indexes of the 20 SSB positions are SSB position indexes 0 to 19 respectively, where one SSB position can be used to transmit one SSB. The maximum number of SSBs without a QCL relationship in the time window is Q=8, and the indexes of these 8 SSBs are SSB QCL indexes 0 to 7 respectively. The frame synchronization can be obtained through SSB position indexes 0 to 19, and the QCL relationship of the SSB can be obtained through SSB QCL indexes 0 to 7, among them, the SSBs with the same SSB QCL index have a QCL relationship or are QCL, the SSBs with different SSB QCL indexes do not have a QCL relationship.

It should be understand that SSBs with different SSB QCL indexes can also have a QCL relationship, the QCL relationship can be agreed by a protocol or configured by the network device. For example, when Q=8, there is a QCL relationship between an SSB with an SSB QCL index 0 and an SSB with an SSB QCL index 4, and there is a QCL relationship between an SSB with an SSB QCL index 1 and an SSB with an SSB QCL index 5, however, in the embodiment of the present application, only the case where there is no QCL relationship between SSBs with different SSB QCL indexes is described as an example. For example, when Q=8, there is no QCL relationship between SSBs with SSB QCL indexes 0 to 7.

The network device determines, according to a result of LBT in the time window, which SBB positions in the candidate SBB positions are used to transmit SSBs, the SSB positions actually transmitting SSBs in different time windows may be the same or different. As show in FIG. 4, if the LBT performed by the network device before the SSB position with the SSB position index 12 is successful, the network device sends SSBs with SSB QCL indexes from 0 to 7 in turn, starting from the SSB position of the SSB position index 12.

In addition to being used for transmitting SSBs, the time window can also be used for transmitting at least one of the following information: a control channel resource set for scheduling the minimum remaining minimum system information (Remaining Minimum System Information, RMSI), RMSI, a channel status information reference signal (Channel Status Information Reference Signal, CSI-RS), other system information (Other System Information, OSI) and a paging message.

Figure 5:
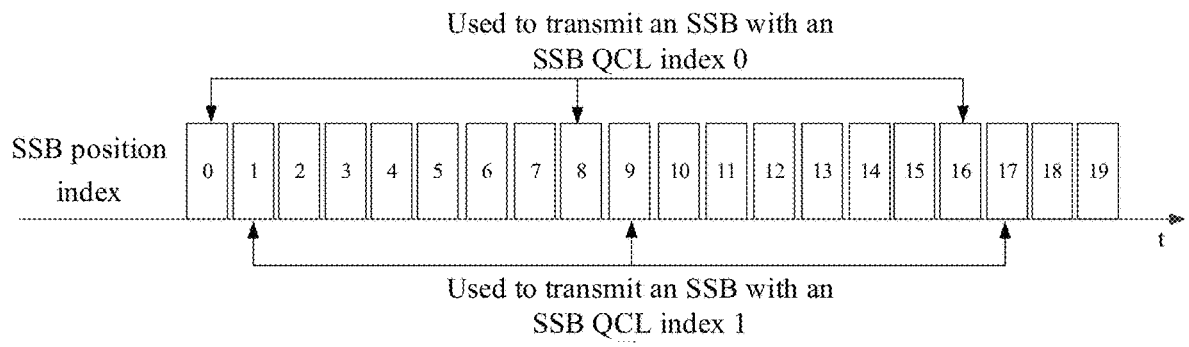
FIG. 5 is a schematic diagram of a relationship between an SSB position index and an SSB QCL index.

There is a certain association relationship between the SSB position index and the SSB QCL index, for example, the SSB QCL index=Mod (the SSB position index, Q), the value range of the SSB QCL index is 0 to Q-1. SSBs with the same Mod (the SSB position index, Q) have a QCL relationship. For example, as show in FIG. 5, SSB positions with SSB position indexes 0, 8, 16 are used to transmit the SSB with an SSB QCL index 0; SSB positions with the SSB position indexes 1, 9, 17 are used to transmit the SSB with an SSB QCL index 1; SSB positions with the SSB position indexes 2, 10, 18 are used to transmit the SSB with an SSB QCL index 2; and so on.

The method of the embodiment of the application can be applied to a contention based RACH (Contention based RACH, CBRA) random access procedure and a contention-free based RACH (Contention-Free based RACH, CFRA) random access procedure.

Figure 6A:
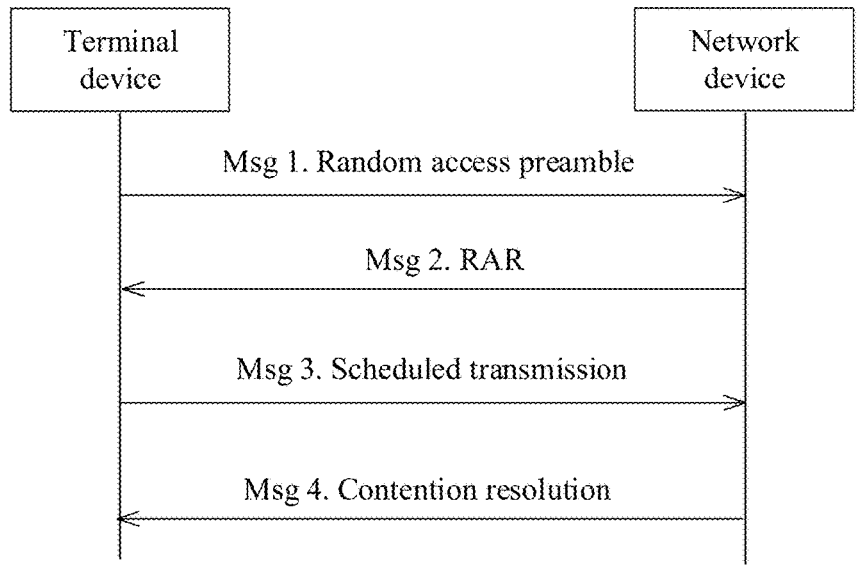
FIG. 6(a) is a flow interaction diagram of a contention based random access procedure.

For example, the contention based random access procedure is show in FIG. 6(a), in a message 1 (Msg 1), a terminal device sends a random access preamble to a network device; in a message 2 (Msg 2), the network device sends a random access response (Random Access Response, RAR) to the terminal device; in a message 3 (Msg 3), a scheduled transmission is performed; in a message 4 (Msg 4), a contention resolution is performed.

Figure 6B:
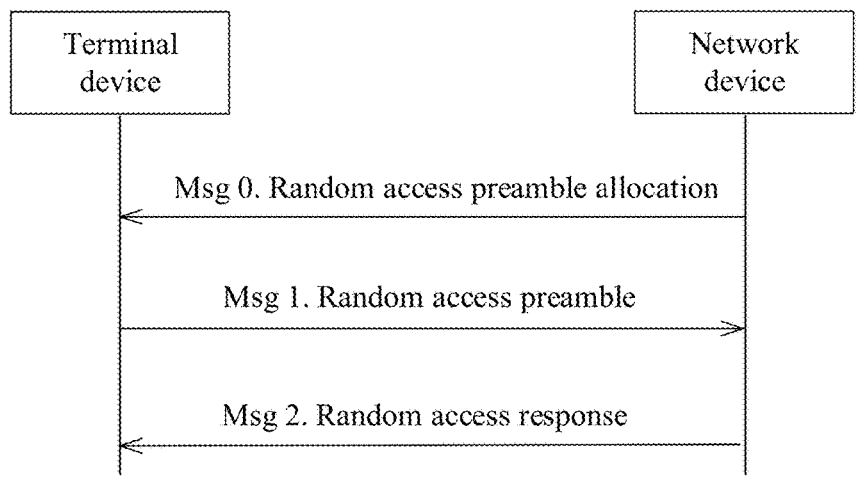
FIG. 6(b) is a flow interaction diagram a contention-free based random access procedure.

The contention-free based random access procedure is show in FIG. 6(b), in a message 0 (Msg 0); the network device allocates a random access preamble to the terminal device; in Msg 1, the terminal device sends a random access preamble to the network device; in message 2 (Msg 2), the network device sends a random access response to the terminal device.

The random access preamble is carried on a physical random access channel (Physical Random Access Channel, PRACH). In an NR system, for the contention based random access procedure, the PRACH resource used by the terminal device to send a PRACH can be a common PRACH resource configured by the network device, the terminal device sends the PRACH using this PRACH resource in a contentious way, for example, the network device can configure 256 kinds of PRACH resources, each PRACH resource has a PRACH configuration index. The network device can indicate an index of the PRACH resource used by a corresponding cell to the terminal device through a system message. The PRACH resource in the embodiments of the present application may include a time domain resource used for sending a PRACH, for example, a PRACH occasion, a frequency domain resource, a code domain resource, such as a PRACH preamble, etc.

Table 1 shows a possible configuration of a PRACH resource. The PRACH configuration index (PRACH Configuration Index) of the PRACH resource is 86, and the PRACH configuration includes a preamble format corresponding to the PRACH resource, a period, an offset of a radio frame, a numbering of a sub-frame in a radio frame, a start symbol in the sub-frame, the number of PRACH slots in the sub-frame, the number of PRACH occasions in the PRACH slot, a duration of the PRACH occasion, etc. According to the information, the terminal device can determine the information of the PRACH resource with a PRACH configuration index 86.

TABLE 1

| PRACH configuration index | Preamble format | $n_{SFN}$ mod $x = y$ | | Numbering of a Sub-frame | Start symbol in the sub-frame | Number of PRACH slots in the sub-frame | Number of PRACH occasions in the PRACH slot | Duration of the PRACH occasion |
|---|---|---|---|---|---|---|---|---|
| | | x | y | | | | | |
| 86 | A1 | 1 | 0 | 0-9 | 7 | 1 | 3 | 2 |

In the embodiment of the present application, there is an association relationship between a PRACH resource and an SSB index, the association relationship can also be indicated to the terminal device through a system message, the terminal device can determine, according to the SSB index of the detected SSB and the association relationship, which resources of the PRACH resources configured by the network device for a corresponding cell can be used for random access. Each PRACH resource includes one or more PRACH occasions. Each SSB can be associated with one or more PRACH occasions, the terminal device sends a PRACH on the associated PRACH occasion. In addition, each SSB may also be associated with one or more contention based preamble indexes, the terminal device selects an appropriate preamble from the preamble indexes associated with the acquired SSB indexes for random access.

Figure 7:
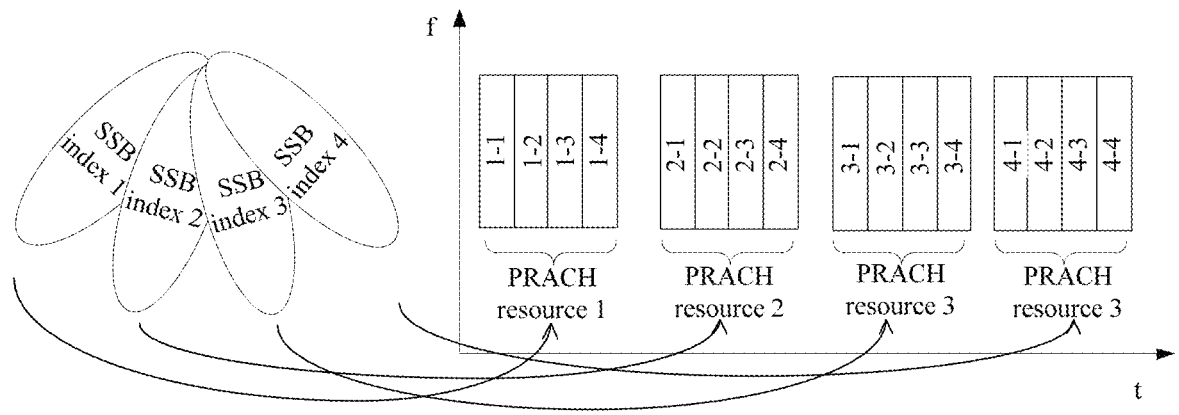
FIG. 7 is a schematic diagram of a relationship between an SSB index and a PRACH resource

For example, as show in FIG. 7, an SSB index 1 is associated with a PRACH resource 1, among them, including: a PRACH occasion 1-1, a PRACH occasion 1-2, a PRACH occasion 1-3 and a PRACH occasion 1-4; an SSB index 2 is associated with a PRACH resource 2, among them, including: a PRACH occasion 2-1, a PRACH occasion 2-2, a PRACH occasion 2-3 and a PRACH occasion 2-4; an SSB index 3 is associated with a PRACH resource 3, among them, including: a PRACH occasion 3-1, a PRACH occasion 3-2, a PRACH occasion 3-3 and a PRACH occasion 3-4; an SSB index 4 is associated with a PRACH resource 4, among them, including: a PRACH occasion 4-1, a PRACH occasion 4-2, a PRACH occasion 4-3 and a PRACH occasion 4-4. The terminal device competitively selects one PRACH occasion among multiple PRACH occasions associated with its SSB index to send the PRACH.

For contention-free based random access procedure, the PRACH resource used by the terminal device to send a PRACH is assigned by the network device to the terminal device. The network device triggers the terminal device to initiate random access by sending a physical downlink control channel (Physical Downlink Control Channel, PDCCH) order to the terminal device. Downlink control information (Downlink Control Information, DCI) in the PDCCH order includes information such as a random access preamble, an uplink indicator or a supplemental uplink indicator (Uplink/Supplement Uplink indicator, UL/SUL indicator), an SS/PBCH index, a PRACH mask index, and the like used by the terminal device for random access. After receiving the PDCCH order, the terminal device may determine a PRACH resource that can be used by the terminal device according to the detected SSB index (such as an SSB index of a SSB with the highest reference signal receiving power (Reference Signal Receiving Power, RSRP) and/or reference signal receiving quality (Reference Signal Receiving Quality, RSRQ)), and the aforementioned association relationship between the SSB index and the PRACH resource configured by the network device. In addition, the terminal device may further determine the actually used PRACH occasion according to the PRACH mask index in the PDCCH order.

Since the SSB index is no longer applicable to the above scenario in an NR-U system, it is necessary to change the association relationship between an SSB index and a PRACH resource, that is, to establish an association relationship among an SSB position index, an SSB QCL index and a PRACH resource.

In an unlicensed spectrum, the terminal device needs to obtain the right of use of a channel through LBT, since the terminal device may suffer from an LBT failure, at this time, the terminal device may not be able to send a PRACH on a PRACH resource which is configured by the network device through the system information, thus affecting the random access performance of the terminal device.

The embodiment of the present application puts forward a random access method, in which the network device can flexibly schedule, through a PDCCH, a common PRACH resource for the terminal device to perform random access, thus increasing opportunities of random access for the terminal device and avoiding the situation that the terminal device cannot perform random access for a long time due to LBT failures and other reasons.

Figure 8:
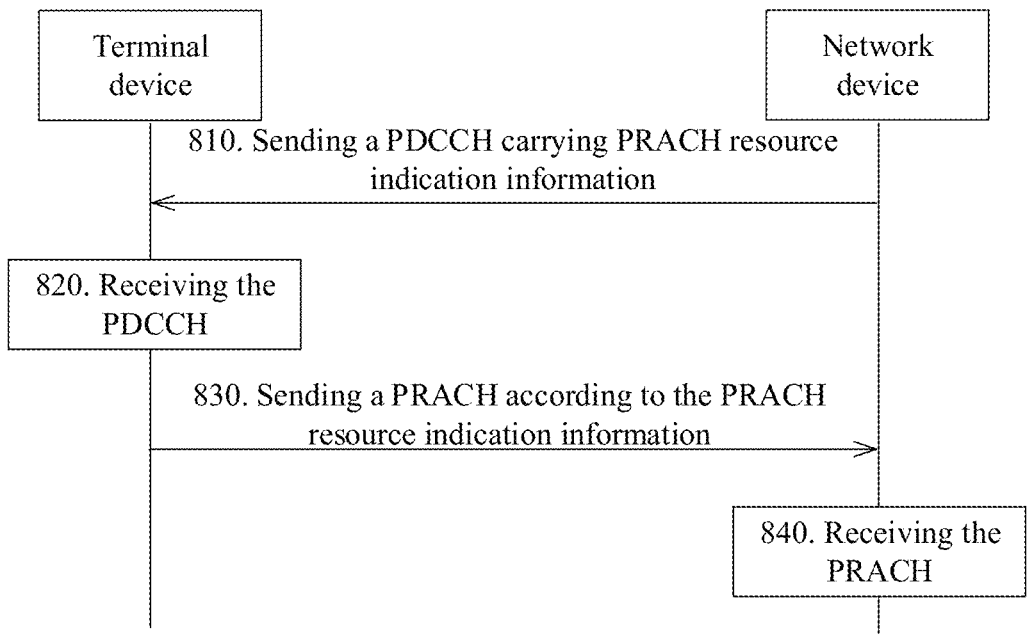
FIG. 8 is a flow interaction diagram of a random access method according to an embodiment of the present application.

FIG. 8 is a flow interaction diagram of a random access method according to an embodiment of the present application. As show in FIG. 8, a method 800 can be performed by a terminal device such as the terminal device 120 shown in FIG. 1 and a network device such as the network device 110 shown in FIG. 1. The method can be applied to a contention based random access procedure. The method 800 may include some or all of the following steps.

In 810, the network device sends a PDCCH to the terminal device.

Where the PDCCH includes PRACH resource indication information, the PRACH resource indication information is used for indicating a common PRACH resource scheduled by a network device.

In 820, the terminal device receives the PDCCH.

In 830, the terminal device sends a PRACH using the PRACH resource according to the PRACH resource indication information.

In 840, the network device receives the PRACH which is sent by the terminal device using the PRACH resource.

In addition to the PRACH resource semi-statically configured by the network device for the terminal device through a system message, the network device can also schedule a flexible PRACH resource for the terminal device through a PDCCH, thus increasing the random access opportunities for the terminal device, thereby improving the random access performance of the terminal device.

Figure 9:
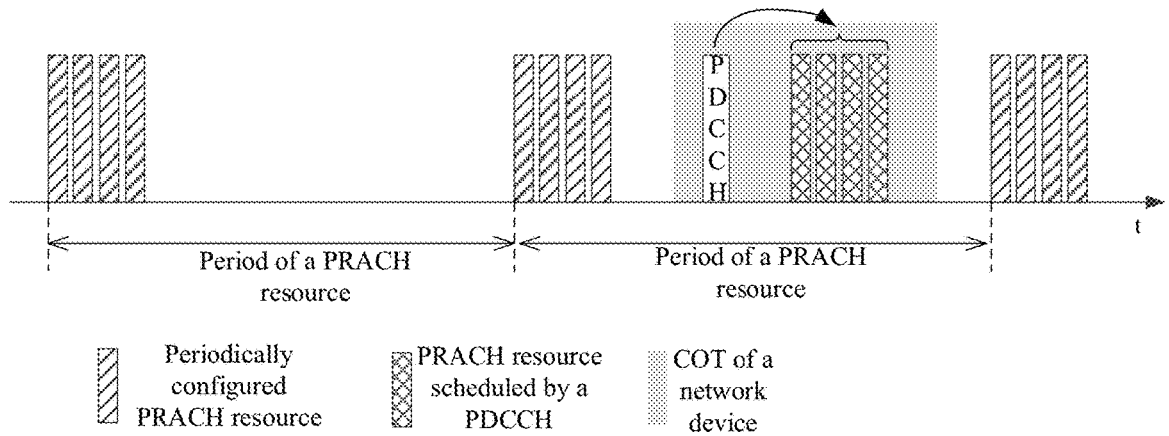
FIG. 9 is schematic diagram of scheduling a common PRACH resource through a PDCCH.

For example, as shown in FIG. 9, the network device is configured with periodic PRACH resources. If the network device obtains the right of use of a channel through LBT, within its channel occupancy time (Channel Occupancy Time, COT), the network device may send a PDCCH to the terminal device, where the PDCCH carries PRACH resource indication information used for indicating a common PRACH resource scheduled by the network device for the terminal device. After receiving the PDCCH, the terminal device determines a corresponding PRACH resource and performs random access using the PRACH resource, according to the PRACH resource indication information carried therein. It should be understand that the PRACH resource scheduled by the network device for the terminal device can be either aperiodic or periodic, FIG. 9 is only an example. The network device indicates a dynamically triggered PRACH resource to the terminal device through DCI carried in the PDCCH, so that the terminal device can use the COT of the network device to complete the transmission of the PRACH.

In the embodiment of the present application, the PRACH resource indication information may include at least one of the following information: information of the PRACH resource, information of an SSB associated with the PRACH resource, and information of a PRACH preamble (referred to as a preamble for short) transmitted on the PRACH resource.

Where the information of the PRACH preamble can be, for example, an index of the PRACH preamble.

Where the information of the SSB can be, for example, an SSB index in an NR system, or an SSB position index and/or an SSB QCL index in an NR-U system. The PRACH resource indication information can carry one or more SSB position indexes and/or SSB QCL indexes.

The SSB position index is used for indicating, among candidate SSB positions, a resource position used to send the SSB, the SSB QCL index is used for indicating information of a QCL relationship of the SSB.

In an implementation, SSBs with the same SSB QCL index are associated with the same PRACH resource.

In an implementation, the SSB QCL index=Mod (the SSB position index, Q).

Where Q is a parameter used for determining the SSB QCL index, for example, Q is the maximum number of SSBs without a QCL relationship sent within a time window; or Q is other value predefined or configured by the network device.

The time window here can be, for example, a DRS window, or other preconfigured windows. A length of the window may be 5 ms. In the time window, the maximum number of SSBs sent by the network device is L, there is no QCL relationships among these L SSBs, or in other words, QCL indexes of the L SSBs are different.

Reference may be made to the above description of FIG. 4 for the related description of the SSB position index and the SSB QCL index, for brevity, details are not repeated here.

Figure 10:
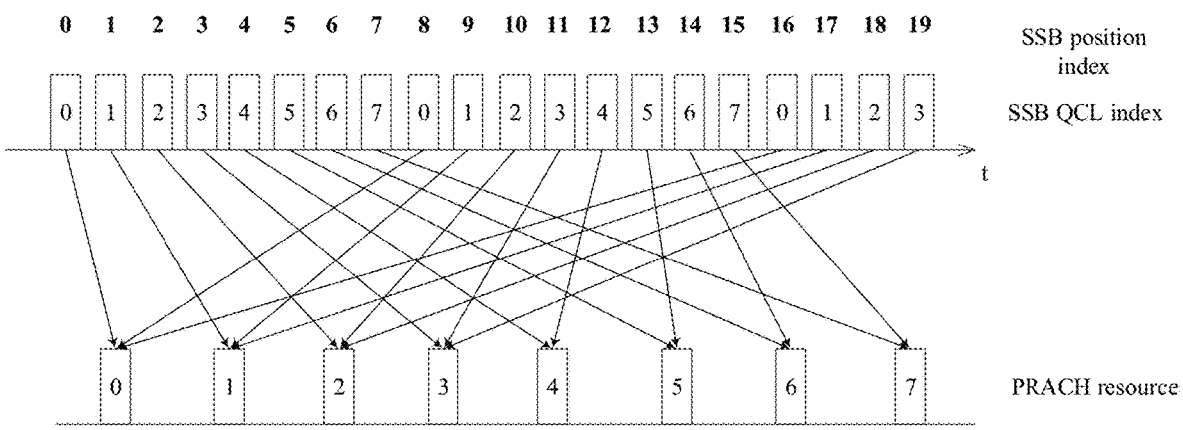
FIG. 10 is a schematic diagram of a relationship among an SSB position index, an SSB QCL index and a PRACH resource.

The PRACH resource may have an association relationship with the SSB position index and the SSB QCL index. For example, as show in FIG. 10, the association relationship between the PRACH resource and the SSB position index and the SSB QCL index, assume that Y=20, Q=8, SSB position indexes are 0 to 19, SSB QCL indexes are 0 to 7. SSBs with the same SSB QCL index are QCL, and SSBs with the same SSB QCL index are associated with the same PRACH resource. The SSB QCL index and the SSB position index satisfy: an SSB QCL index=Mod (an SSB position index, Q). As show in FIG. 10, an SSB QCL index 0 is associated with a PRACH resource 0, an SSB QCL index 1 is associated with a PRACH resource 1, an SSB QCL index 2 is associated with a PRACH resource 2, an SSB QCL index 3 is associated with a PRACH resource 3, an SSB QCL index 4 is associated with a PRACH resource 4, an SSB QCL index 5 is associated with a PRACH resource 5, an SSB QCL index 6 is associated with a PRACH resource 6, and an SSB QCL index 7 is associated with a PRACH resource 7.

Based on that an SSB QCL index=Mod (an SSB position index, Q), it can be known that SSBs with the same Mod (SSB position index, Q) are QCL, and can be associated with the same PRACH resource. SSB position indexes 0, 8 and 16 correspond to the same SSB QCL index 0, that is, SSB position indexes 0, 8 and 16 are associated with the PRACH resource 0, and SSBs sent on the SSB positions with the SSB position indexes 0, 8, 16 have a QCL relationship; SSB position indexes 1, 9 and 17 correspond the same SSB QCL index 1, that is, SSB position indexes 1, 9 and 17 are associated with the PRACH resource 1, and SSBs sent on the SSB positions with the SSB position indexes 1, 9 and 17 have a QCL relationship; SSB position indexes 2, 10 and 18 correspond the same SSB QCL index 2, that is, SSB position indexes 2, 10 and 18 are associated with the PRACH resource 2, and SSBs sent on the SSB positions with the SSB position indexes 2, 10 and 18 have a QCL relationship; SSB position indexes 3, 11 and 19 correspond the same SSB QCL index 3, that is, SSB position indexes 3, 11 and 19 are associated with the PRACH resource 3, and SSBs sent on the SSB positions with the SSB position indexes 3, 11 and 19 have a QCL relationship; PRACH resources associated with other SSB position indexes can be determined according to the similar method.

A PRACH resource associated with one SSB can include one or more PRACH occasions, that is, one SSB is associated with one or more PRACH occasions. And multiple SSBs can be associated with same PRACH occasion, or different PRACH occasions.

The association relationship between the PRACH resource and the SSB position index and the SSB QCL index, for example, can be indicated by the network device to the terminal device through a system message, such as ssb-perRACH-OccasionAndCB-PreamblesPerSSB carried in the system message.

In an implementation, Q can be carried in system information or a DMRS of a PBCH; or Q is preconfigured. For example, there are 8 kinds of DMRS sequences, 3 bits of information can be indicated, the 3 bits of information can be used for indicating Q.

In an implementation, there can be an association relationship between the SSB index and the PRACH preamble, the terminal device can perform random access using the PRACH preamble associated with the detected SSB index.

One SSB can be associated with one or more PRACH preambles, multiple SSBs can be associated with the same PRACH preamble or different PRACH preambles.

The PRACH resource indication information can include one or more of the following information: information of the PRACH resource, an SSB position index and/or an SSB QCL index, an index of a PRACH preamble.

For example, the PRACH resource indication information includes information of a PRACH resource, the terminal device acquires a PRACH resource scheduled by the network device and performs random access using the PRACH resource, according to the information of the PRACH resource.

For another example, the PRACH resource indication information includes an SSB position index and/or an SSB QCL index, the terminal device can determine a PRACH resource that can be used by the terminal device according to the SSB position index and/or the SSB QCL index, and the association relationship between the PRACH resource and the SSB position index and/or the SSB QCL index. The association relationship, for example, can be indicated by the network device to the terminal device through system information, the association relationship, for example, may be shown in FIG. 10.

For another example, the PRACH resource indication information includes an SSB index and information of the PRACH resource. At this time, the PRACH resource can be the PRACH resource configured by the network device for some SSB indexes. If an SSB index detected by the terminal device is the SSB index carried in the PRACH resource indication information, the terminal device can use the PRACH resource scheduled by the PRACH resource indication information. Further, when the PRACH resource indication information includes multiple SSB position indexes and/or SSB QCL indexes, the terminal device can determine, in PRACH resources indicated by the PRACH resource indication information, the PRACH resource that can be used by the terminal device according to the detected SSB position index and/or SSB QCL index, and the association relationship between the PRACH resource and the SSB position index and/or the SSB QCL index. The association relationship, for example, may be shown in FIG. 10.

For another example, the PRACH resource indication information includes information of a PRACH resource, and includes an index of a PRACH preamble transmitted on the PRACH resource. At this time, the terminal device acquires the PRACH resource scheduled by the network device for the terminal device, and performs random access using the PRACH preamble on the PRACH resource.

For another example, the PRACH resource indication information includes an index of a PRACH preamble. The terminal device determines the PRACH resource that can be used by the terminal device through the index of the PRACH preamble, and the association relationship between the index of the PRACH preamble, the SSB position index and/or the SSB QCL index, and the PRACH resource.

For another example, the PRACH resource indication information includes an SSB position index and/or an SSB QCL index, and includes an index of a PRACH preamble. The terminal device determines the PRACH resource that can be used by the terminal device according to the detected SSB position index and/or SSB QCL index, and the association relationship between the PRACH resource and the SSB position index and/or the SSB QCL index, and performs random access using the PRACH preamble on the PRACH resource.

For another example, the PRACH resource indication information includes an SSB position index and/or an SSB QCL index, information of the PRACH resource, and an index of a PRACH preamble. At this time, the terminal device selects the PRACH resource that can be used by the terminal device in PRACH resources determined according to the information of the PRACH resource, according to the detected SSB position index and/or SSB QCL index, and the association relationship between the PRACH resource and the SSB position index and/or the SSB QCL index, and performs random access using the PRACH preamble on the PRACH resource.

In above examples, when the PRACH resource indication information includes the information of the PRACH resource, the information of the PRACH resource can include at least one of the following information:

an index of the PRACH resource, information of a time-frequency position of the PRACH resource, a format of the PRACH preamble transmitted on the PRACH resource, information of a PRACH occasion available for random access in the PRACH resource, an effective duration of the PRACH resource, and an offset of the PRACH resource relative to a specific resource.

Among them, the index of the PRACH resource, for example, can be a PRACH configuration index, multiple PRACH resources can be preconfigured; each of the PRACH resources has one PRACH configuration index. The network device indicates one PRACH configuration index to the terminal device though the PRACH resource indication information, the terminal device can know which PRACH resource, among the preconfigured multiple PRACH resources, is the PRACH resource flexibly scheduled by the network device for the terminal device. Preferably, a variety of PRACH resources that are preconfigured can reuse the PRACH resources periodically configured by the network device through the system information.

The information of the time-frequency position of the PRACH resource, for example, can include at least one of the following information: a period of the PRACH resource, an offset of a radio frame in which the PRACH resource is located, a numbering of a sub-frame occupied by the PRACH resource in the radio frame, a start symbol of the PRACH resource in the sub-frame, the number of slots occupied by the PRACH resource in the sub-frame, the number of PRACH occasions in the slot, and a duration of the PRACH occasion. The network device carries one or more of the parameters in the PRACH resource indication information, thus the terminal device can determine the PRACH resource scheduled by the network device for the terminal device.

The Information of the time-frequency position of the PRACH resource may include other parameters, such as one or more of the information: a time domain length, time domain start and stop positions, a frequency domain length, frequency domain length start and stop positions, a preamble format of the PRACH resource scheduled by the network device. The terminal device determines, according to said information, the PRACH resource scheduled by the network device for the terminal device. The information of the time-frequency position of the PRACH resource in the PRACH resource indication information is not limited by the embodiments of the present application, as long as it can be used to determine the time-frequency resource position for sending a PRACH.

The information of the PRACH occasion available for random access in the PRACH resource refers to which PRACH occasions among multiple PRACH occasions included in the PRACH resource scheduled by the network device are the PRACH occasions scheduled this time and available for the terminal device to send the PRACH. According to the information of the PRACH occasion, the terminal device can determine which PRACH occasions in the PRACH resource indicated by the PRACH resource indication information can be used for sending a PRACH. For example, if the PRACH resource scheduled by the network device through a PDCCH includes four occasions, the first two PRACH occasions are indicated in the PRACH resource indication information, the terminal device can send a PRACH on the first two PRACH occasions among the four PRACH occasions.

The effective duration of the PRACH resource means that the PRACH resource scheduled by the network device at this time can be used for random access by the terminal device within the effective duration, which can also be called an effective time interval. The effective duration, for example, may be less than or equal to a COT of the network device, when the effective duration is equal to the COT of the network device, the effective duration may also be indicated through COT indication information, rather than the PRACH resource indication information.

The offset of the PRACH resource relative to a specific resource may be an offset of the PRACH resource relative to a PRACH resource configured by the network device thought system information.

For example, when the PRACH resource indication information carries an index of a PRACH resource and the offset, the terminal device can determine a PRACH resource according to the index of the PRACH resource, and offset the PRACH resource indicated by the index according to the offset time, so as to obtain the position of the PRACH resource scheduled by the network device.

The offset of the PRACH resource relative to a specific resource may also be the offset of the PRACH resource relative to the PDCCH carrying the PRACH resource indication information.

For example, the PRACH resource indication information carries the time domain length and the offset of the PRACH resource, the terminal device can determine, according to the time domain length and the offset, a resource which is separated from the PDCCH with an interval equal to the offset and has a length equal to the time domain length as the PRACH resource scheduled by the network device.

The offset of the PRACH resource relative to a specific resource may also be the offset of the PRACH resource relative to a COT indicated by the COT indication information, for example, the offset relative to the start or the end time of the COT.

The specific resource may also be the PRACH resource determined based on the information of the time-frequency position of the PRACH resource carried in the PRACH resource indication information. For example, the PRACH resource indication information carries the information of the time-frequency position of the PRACH resource and the offset, the terminal device offsets, according to the offset, the PRACH resource determined based on the information of the time-frequency position, so as to obtain the position of the PRACH resource scheduled by the network device.

In addition, the specific resource may also be another previously known or preset resource location, which is not limited in the present application.

The offset can include an offset in a time domain and/or a frequency domain.

In an implementation, the PRACH resource indication information and the COT indication information are located in the same DCI carried by the PDCCH. The overhead of the PDCCH can be reduced by carrying the PRACH resource indication information and the COT indication information in the same DCI.

The COT indication information is used for indicating channel acquisition of the network device, the COT indication information, for example, may include at least one of the following information: a start time and an end time of a COT of the network device, frequency domain information of the COT, a slot format of the COT, shared information of the COT, and a length of the COT.

The PDCCH is a PDCCH in a common search space. Where the PRACH resource indication information and the COT indication information are carried on a group common PDCCH of the common search space, and used to indicate information of the COT obtained by the network device.

In an implementation, the PRACH occasion in the common PRACH resource triggered by the PDCCH occupies an uplink symbol in the COT.

It should be understand that in a contention-free based random access procedure, the above PDCCH may be a PDCCH order, at this time, the PDCCH order is used to schedule a dedicated PRACH resource for the terminal device. The PDCCH carries an SSB position index and/or an SSB QCL index. The terminal device can acquire the PRACH resource for sending the PRACH according to the SSB position index and/or the SSB QCL index.

For example, the terminal device obtains an SSB position index through detection, and calculates a corresponding SSB QCL index according to the SSB position index and Q, where the SSB QCL index=Mod (the SSB position index, Q). The terminal device determines a PRACH resource associated with the SSB QCL index according to an association relationship between the PRACH resource and the SSB QCL index, and sends the PRACH using the PRACH resource. The terminal device can also determine a preamble for use according to an association relationship between the SSB QCL index and the preamble, an association relationship between the SSB position index and the preamble or an association relationship between the PRACH resource and preamble.

For another example, the terminal device obtains the SSB position index through detection, and determines a PRACH resource associated with the SSB position index according to an association relationship between the SSB position index and the PRACH resource, and sends a PRACH using the PRACH resource. Where SSB position indexes with the same Mod (SSB position index, Q) associate with the same PRACH resource. The terminal device can also determine a preamble for use according to an association relationship between the SSB position index and the preamble or an association relationship between the PRACH resource and the preamble. Or, the terminal device calculates an SSB QCL index according to the SSB position index, and determines a preamble for use according to an association relationship between the SSB QCL index and the preamble.

It should be noted that, on the premise of no conflict, each embodiment described in the present application and/or technical features in each embodiment can be arbitrarily combined with each other, and the technical solutions obtained after combination should also fall into the protection scope of the present application.

In various embodiments of the present application, the sequence numbers of the above-mentioned processes do not indicate the execution order. The execution order of each process should be determined by its functions and internal logic, and should not constitute any limitation on the implementation process of the embodiments of the present application.

The random access method according to the embodiment of the present application is described in detail above, and the apparatus according to the embodiment of the present application will be described below with reference to FIG. 11 to FIG. 15. The technical features described in the method embodiment are applicable to the following apparatus embodiments.

Figure 11:
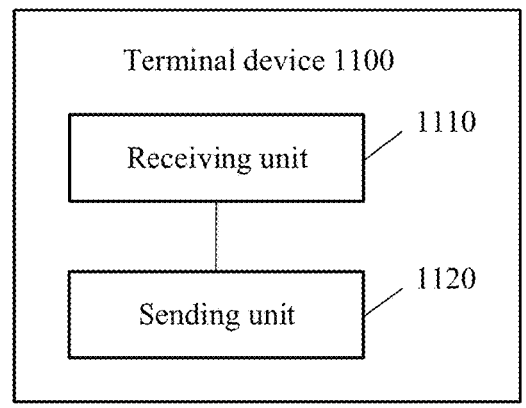
FIG. 11 is a schematic block diagram of a terminal device according to an embodiment of the present application.

FIG. 11 is a schematic block diagram of a terminal device 1100 according to an embodiment of the present application. As show in FIG. 11, the terminal device 1100 includes a receiving unit 1110 and a sending unit 1120.

The receiving unit 1110, configured to receive a PDCCH, where the PDCCH includes PRACH resource indication information, the PRACH resource indication information is used for indicating a common PRACH resource scheduled by a network device, the PRACH resource indication information includes at least one of the following information:

information of the PRACH resource, information of a synchronization signal block SSB associated with the PRACH resource, and information of a PRACH preamble transmitted on the PRACH resource; and a sending unit 1120, configured to send a PRACH according to the PRACH resource indication information, using the PRACH resource.

Therefore, the network device can flexibly schedule the common PRACH resource for the terminal device for random access through the PDCCH, the terminal device acquires the opportunities of random access by receiving the PDCCH, and avoiding the situation that the terminal device cannot perform random access for a long time due to LBT failures and other reasons, and improving the random access performance of the terminal device.

In an implementation, the information of the PRACH resource includes at least one of the following information: an index of the PRACH resource, information of a time-frequency position of the PRACH resource, a format of the PRACH preamble transmitted on the PRACH resource, information of a PRACH occasion available for random access in the PRACH resource, an effective duration of the PRACH resource, and an offset of the PRACH resource relative to a PRACH resource configured by the network device through the system information.

In an implementation, the information of the time-frequency position of the PRACH resource includes at least one of the following information: a period of the PRACH resource, an offset of a radio frame in which the PRACH resource is located, a numbering of a sub-frame occupied by the PRACH resource in the radio frame, a start symbol of the PRACH resource in the sub-frame, a number of slots occupied by the PRACH resource in the sub-frame, a number of PRACH occasions in the slot, and a duration of the PRACH occasion.

In an implementation, the information of the SSB includes an SSB index.

In an implementation, the SSB index includes an SSB position index and/or an SSB QCL index, where the SSB position index is used for indicating a position for sending the SSB in a candidate SSB position, the SSB QCL index is used for indicating information of a QCL relationship of the SSB.

In an implementation, SSBs with the same SSB QCL index are associated with the same PRACH resource.

In an implementation, the SSB QCL index=Mod (the SSB position index, Q), where Q is a maximum number of SSBs without a QCL relationship sent within a time window.

In an implementation, Q is carried in system information or a demodulation reference signal DMRS of a physical broadcast channel PBCH; or Q is preconfigured.

In an implementation, the information of the PRACH preamble includes an index of the PRACH preamble.

In an implementation, the PRACH resource indication information and COT indication information are located in the same DCI carried by the PDCCH.

In an implementation, the COT indication information includes at least one of the following information: a start time and an end time of a COT of the network device, frequency domain information of the COT, a slot format of the COT, shared information of the COT, and a length of the COT.

In an implementation, the PRACH occasion occupies an uplink symbol in the COT.

In an implementation, the PDCCH is a PDCCH in a common search space.

Figure 12:
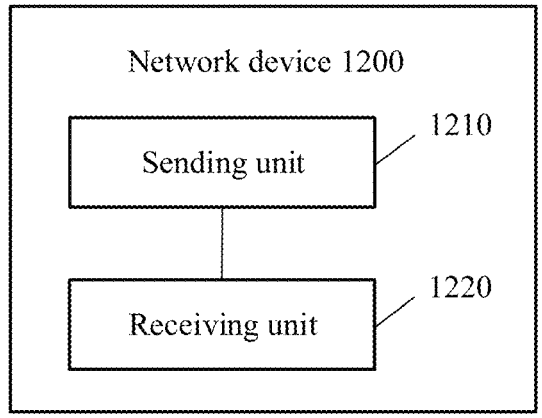
FIG. 12 is a schematic block diagram of a network device according to an embodiment of the present application.

FIG. 12 is a schematic block diagram of a network device 1200 according to an embodiment of the present application. As show in FIG. 12, the network device 1200 includes a sending unit 1210 and a receiving unit 1220.

The sending unit 1210, configured to send a physical downlink control channel PDCCH, where the PDCCH includes physical random access channel PRACH resource indication information, the PRACH resource indication information is used for indicating a common PRACH resource scheduled by a network device, the PRACH resource indication information includes at least one of the following information: information of the PRACH resource, information of a synchronization signal block SSB associated with the PRACH resource, and information of a PRACH preamble transmitted on the PRACH resource; and a receiving unit 1220, configured to receive a PRACH which is sent by the terminal device using the PRACH resource.

Therefore, the network device can flexibly schedule the common PRACH resource for the terminal device for random access through the PDCCH, thus increasing the opportunities of random access for the terminal device, avoiding the situation that the terminal device cannot perform random access for a long time due to LBT failures and other reasons, and improving the random access performance of the terminal device.

In an implementation, the information of the PRACH resource includes at least one of the following information: an index of the PRACH resource, a period of the PRACH resource, information of a time-frequency position of the PRACH resource, a format of the PRACH preamble transmitted on the PRACH resource, information of a PRACH occasion available for random access in the PRACH resource, an effective duration of the PRACH resource, and an offset of the PRACH resource relative to a specific resource.

In an implementation, the information of a time-frequency position of the PRACH resource includes at least one of the following information: an offset of a radio frame in which the PRACH resource is located, a numbering of a sub-frame occupied by the PRACH resource in the radio frame, a start symbol of the PRACH resource in the sub-frame, a number of slots occupied by the PRACH resource in the sub-frame, a number of PRACH occasions in the slot, and a duration of the PRACH occasion.

In an implementation, the information of the SSB includes an SSB index.

In an implementation, the SSB index includes an SSB position index and/or an SSB quasi-co-located QCL index, where the SSB position index is used for indicating a position for sending the SSB in a candidate SSB position, the SSB QCL index is used for indicating information of a QCL relationship of the SSB.

In an implementation, SSBs with the same SSB QCL index are associated with the same PRACH resource.

In an implementation, the SSB QCL index=Mod (the SSB position index, Q), where Q is a maximum number of SSBs without a QCL relationship sent within a time window.

In an implementation, Q is carried in system information or a demodulation reference signal DMRS of a physical broadcast channel PBCH; or Q is preconfigured.

In an implementation, the information of the PRACH preamble includes an index of the PRACH preamble.

In an implementation, the PRACH resource indication information and COT indication information are located in the same DCI carried by the PDCCH.

In an implementation, the COT indication information includes at least one of the following information: a start time and an end time of a COT of the network device, frequency domain information of the COT, a slot format of the COT, shared information of the COT, and a length of the COT.

In an implementation, the PRACH occasion occupies an uplink symbol in the COT.

In an implementation, the PDCCH is a PDCCH in a common search space.

Figure 13:
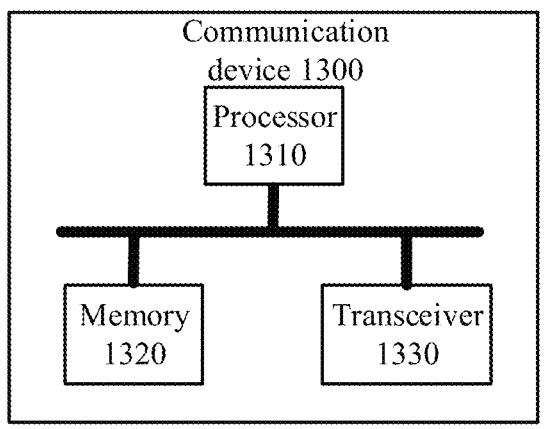
FIG. 13 is a schematic structural diagram of a communication device according to an embodiment of the present application.

FIG. 13 is a schematic structural diagram of a communication device 1300 according to an embodiment of the present application. The communication device 1300 shown in FIG. 13 includes a processor 1310, the processor 1310 can call and run a computer program to implement the method in an embodiment of the present application.

In an implementation, as show in FIG. 13, the communication device 1300 may also include a memory 1320. Where the processor 1310 can call and run the computer program from the memory to implement the method in an embodiment of the present application.

Where the memory 1320 can be a separate device independent of the processor 1310 or integrated in the processor 1310.

In an implementation, as show in FIG. 13, the communication device 1300 may also include a transceiver 1330, the processor 1310 can control the transceiver 1330 to communicate with other devices, specifically, can send information or data to other devices, or receive information or data sent by the other devices.

Where the transceiver 1330 can include a transmitter and a receiver. The transceiver 1330 can also include an antenna, and the number of antennas may be one or more.

In an implementation, the communication device 1300 can specifically be the terminal device of the embodiment of the present application, and the communication device 1300 can implement the corresponding processes implemented by the terminal device in each method of an embodiment of the present application, details are not repeated here for brevity.

In an implementation, the communication device 1300 can specifically be the network device of the embodiment of the present application, and the communication device 1300 can implement the corresponding processes implemented by the network device in each method of an embodiment of the present application, details are not repeated here for brevity.

Figure 14:
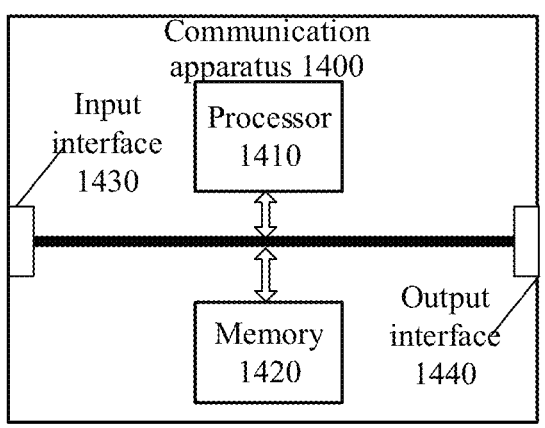
FIG. 14 is a schematic structural diagram of a communication apparatus according to an embodiment of the present application.

FIG. 14 is a schematic structural diagram of a communication apparatus according to an embodiment of the present application. The apparatus 1400 show in FIG. 14 includes a processor 1410, the processor 1410 can call and run a computer program to implement the method in an embodiment of the present application.

In an implementation, as show in FIG. 14, the apparatus 1400 may also include a memory 1420. Where the processor 1410 can call and run a computer program from the memory to implement the method in an embodiment of the present application.

Where the memory 1420 can be a separate device independent of the processor 1410 or integrated in the processor 1410.

In an implementation, the apparatus 1400 can also include an input interface 1430. Where the processor 1410 can control the input interface 1430 to communication with other devices or chips, specifically, can acquire information or data sent by other devices or chips.

In an implementation, the apparatus 1400 can also include an output interface 1440. Where the processor 1410 can control the output interface 1440 to communication with other devices or chips, specifically, can output information or data to other devices or chips.

In an implementation, the apparatus 1400 can be applied to the network device of the embodiment of the present application, and the communication apparatus can implement the corresponding processes implemented by the network device in each method of an embodiment of the present application, details are not repeated here for brevity.

In an implementation, the apparatus 1400 can be applied to the terminal device of the embodiment of the present application, and the communication apparatus can implement the corresponding processes implemented by the terminal device in each method of an embodiment of the present application, details are not repeated here for brevity.

In an implementation, the apparatus 1400 can be a chip. The chip can also be a system-level chip, a system chip, a chip system, a system-on-chip, or the like.

It should be understood that the processor of the embodiments of the present application may be an integrated circuit chip with signal processing capabilities. In the implementation process, the steps of the foregoing method embodiments can be completed by an integrated logic circuit in hardware of the processor or by instructions in the form of software. The above-mentioned processor may be a general-purpose processor, a digital signal processor (Digital Signal Processor, DSP), an application specific integrated circuit (Application Specific Integrated Circuit, ASIC), a field programmable gate array (Field Programmable Gate Array, FPGA) or other programming logic devices, discrete gates or transistor logic devices, discrete hardware components, which can implement or perform the methods, steps, and logical block diagrams disclosed in the embodiments of the present application. The general-purpose processor may be a microprocessor, or the processor may also be any conventional processor or the like. The steps of the methods disclosed in the embodiments of the present application can be directly embodied as being executed and completed by a hardware decoding processor, or being executed and completed by a combination of hardware and software modules in a decoding processor. The software modules can be located in a mature storage medium in the art such as a random access memory, a flash memory, a read-only memory, a programmable read-only memory, an electrically erasable programmable memory, a register, etc. The storage medium is located in a memory, and the processor reads information from the memory and completes the steps of the above methods in combination with hardware thereof.

The memory in the embodiments of the present application may be a volatile memory or a non-volatile memory, or may include both volatile and non-volatile memories. The non-volatile memory may be a read-only memory (Read-Only Memory, ROM), a programmable read-only memory (Programmable ROM, PROM), an erasable programmable read-only memory (Erasable PROM, EPROM), and an electrically erasable programmable read-only memory (Electrically EPROM, EEPROM) or a flash memory. The volatile memory may be a random access memory (Random Access Memory, RAM), which is used as an external cache. By way of exemplary but not restrictive description, many forms of RAMs are available, such as a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchronous link dynamic random access memory (Synchlink DRAM, SLDRAM)) and a direct rambus random access memory (Direct Rambus RAM, DR RAM).

The foregoing memories are exemplary but not restrictive. For example, the memory in the embodiments of the present application may also be a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synch link dynamic random access memory (synch link DRAM, SLDRAM) and a direct memory bus random access memory (Direct Rambus RAM, DR RAM), etc. That is to say, the memories in the embodiments of the present application are intended to include, but not limited to, these and any other suitable types of memories.

Figure 15:
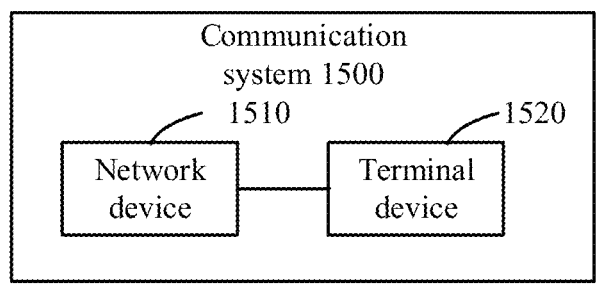
FIG. 15 is a schematic block diagram of a communication system according to an embodiment of the present application.

FIG. 15 is a schematic block diagram of a communication system 1500 according to an embodiment of the present application. As show in FIG. 15, the communication system 1500 includes a network device 1510 and a terminal device 1520.

Where the network device 1510 is configured to: send a PDCCH, the PDCCH including PRACH resource indication information; and receive a PRACH which is sent by the terminal device using the PRACH resource.

The terminal device 1520 is configured to: receive the PDCCH, the PDCCH including the PRACH resource indication information; and the terminal device sends the PRACH using the PRACH resource according to the PRACH resource indication information.

Where the PRACH resource indication information is used for indicating a common PRACH resource scheduled by a network device, the PRACH resource indication information includes at least one of the following information: information of the PRACH resource, information of a synchronization signal block SSB associated with the PRACH resource, and information of a PRACH preamble transmitted on the PRACH resource.

The network device 1510 can be used for implementing the corresponding function implemented by the network device in the method of an embodiment of the present application, and the composition of the network device 1510 can be as that shown in the network 1200 in FIG. 12, details are not repeated here for brevity.

The terminal device 1520 can be used for implementing the corresponding function implemented by the terminal device in the method of an embodiment of the present application, and the composition of the terminal device 1520 can be as that shown in the terminal 1100 in FIG. 11, details are not repeated here for brevity.

An embodiment of the present application also provides a computer-readable storage medium for storing a computer program. In an implementation, the computer-readable storage medium can be applied to the terminal device in the embodiments of the present application, and the computer program causes a computer to execute corresponding processes implemented by the terminal device in respective methods of the embodiments of the present application. For brevity, details are not repeated here. In an implementation, the computer-readable storage medium can be applied to the mobile network device in the embodiments of the present application, and the computer program causes the computer to execute corresponding processes implemented by the mobile network in respective methods of the embodiments of the present application. For brevity, details are not repeated here.

An embodiment of the present application also provides a computer program product, including computer program instructions. In an implementation, the computer program product can be applied to the terminal device in the embodiments of the present application, and the computer program instructions cause a computer to execute corresponding processes implemented by the terminal device in respective methods of the embodiments of the present application. For brevity, details are not repeated here. In an implementation, the computer program product can be applied to the mobile network device in the embodiments of the present application, and the computer program instructions cause the computer to execute corresponding processes implemented by the mobile network device in respective methods of the embodiments of the present application. For brevity, details are not repeated here.

An embodiment of the present application also provides a computer program. In an implementation, the computer program can be applied to the terminal device in the embodiments of the present application. When the computer program runs on a computer, the computer is caused to execute corresponding processes implemented by the terminal device in respective methods of the embodiments of the present application. For brevity, details are not repeated here. In an implementation, the computer program can be applied to the network device in the embodiments of the present application. When the computer program runs on the computer, the computer is caused to execute corresponding processes implemented by the network device in respective methods of the embodiments of the present application. For brevity, details are not repeated here.

It should be understood that the terms "system" and "network" are often used interchangeably herein. The term "and/or" herein is only an association relationship for describing associated objects, and means that there can be three types of relationships. For example, the expression "A and/or B" may indicate three cases: A exists alone, A and B exist at the same time, and B exists alone. In addition, the character "/" herein generally indicates that the associated objects before and after the character are in an "or" relationship.

In the embodiments of the present disclosure, "B corresponding to A" represents that B is associated with A, and B can be determined according to A. However, it should be understood that the determination of B according to A does not mean that the determination of B is only according to A, but can also be according to A and/or other information.

A person of ordinary skill in the art may realize that the units and algorithm steps of the examples described in combination with the embodiments disclosed herein can be implemented by electronic hardware, or a combination of computer software and electronic hardware. Whether these functions are executed by hardware or software depends on specific applications and design constraints for the technical solution. Those skilled persons can use different methods to implement the described functions for each specific application, but such implementations should not be considered beyond the scope of the present application.

Those skilled in the art can clearly understand that, for convenience and concise description, the corresponding processes in the foregoing method embodiments may be referred to for the specific working processes of the above-described system, apparatus, and unit, and details are not repeated here.

It should be understood that the system, apparatus, and method disclosed in the several embodiments provided in the present application may be implemented in other ways. For example, the apparatus embodiments described above are merely illustrative. For example, the division of the units is only a logical function division, and there may be other divisions in actual implementation. For example, multiple units or components may be combined or may be integrated into another system, or some features can be ignored or not implemented. In addition, the displayed or discussed mutual coupling or direct coupling or communication connection may be indirect coupling or communication connection through some interfaces, apparatuses or units, and may be in electrical, mechanical or other forms.

The units described as separate components may or may not be physically separated, and the components displayed as units may or may not be physical units, that is, they may be located in one place, or they may be distributed on multiple network units. Some or all of the units may be selected according to actual needs to achieve the objectives of the solutions of the embodiments.

In addition, the functional units in the various embodiments of the present application may be integrated into one processing unit, or each unit may exist alone physically, or two or more units may be integrated into one unit.

If the functions are implemented in the form of software functional units and sold or used as an independent product, they can be stored in a computer readable storage medium. Based on this understanding, the essence, or the part that contributes to the prior art, or part of the technical solutions of the present application can be embodied in the form of a software product. The computer software product is stored in a storage medium, including several instructions used to cause a computer device (which may be a personal computer, a server, or a network device, etc.) to execute all or part of the steps of the methods described in the various embodiments of the present application. The aforementioned storage medium includes: a U disk, a mobile hard disk, a read-only memory (Read-Only Memory, ROM), a random access memory (Random Access Memory, RAM), a magnetic disk, an optical disk, or other media that can store program codes.

The above description is only specific implementations of the present application, but the protection scope of the present application is not limited thereto. Any person skilled in the art can easily think of changes or substitutions within the technical scope disclosed in the present application, which should be covered within the protection scope of the present application. Therefore, the protection scope of the present application shall be subject to the protection scope of the claims.

What is claimed is:

1. A random access method, the method comprising:
receiving, by a terminal device, a physical downlink control channel (PDCCH), wherein the PDCCH comprises physical random access channel (PRACH) resource indication information, the PRACH resource indication information comprises at least one of the following information: information of a PRACH resource, information of a synchronization signal block (SSB) associated with the PRACH resource, and information of a PRACH preamble transmitted on the PRACH resource; and
determining, by the terminal device according to the PRACH resource indication information, the PRACH resource scheduled by a network device for the terminal device, and sending a PRACH using the PRACH resource;
wherein the SSB has an SSB position index and an SSB quasi-co-located (QCL) index, and the SSB position index is used for indicating a position for sending the SSB in a candidate SSB position, the SSB QCL index is used for indicating information of a QCL relationship of the SSB; there is an association relationship among the SSB position index, the SSB QCL index and the PRACH resource.

2. The method according to claim 1, wherein the information of the SSB comprises the SSB QCL index.

3. The method according to claim 2, wherein SSBs with a same SSB QCL index are associated with a same PRACH resource.

4. The method according to claim 2, wherein the SSB QCL index=Mod (the SSB position index, Q), wherein the Q is a maximum number of SSBs without a QCL relationship sent within a time window.

5. The method according to claim 4, wherein the Q is carried in system information or a demodulation reference signal (DMRS) of a physical broadcast channel (PBCH); or the Q is preconfigured.

6. The method according to claim 1, wherein the information of the PRACH preamble comprises an index of the PRACH preamble.

7. A random access method, the method comprising:
sending, by a network device, a physical downlink control channel (PDCCH), wherein the PDCCH comprises physical random access channel (PRACH) resource indication information, the PRACH resource indication information comprises at least one of the following information: information of a PRACH resource, information of a synchronization signal block (SSB) associated with the PRACH resource, and information of a PRACH preamble transmitted on the PRACH resource; and
receiving, by the network device, a PRACH which is sent by the terminal device using the PRACH resource;
wherein the SSB has an SSB position index and a SSB quasi-co-located (QCL) index, and the SSB position index is used for indicating a position for sending the SSB in a candidate SSB position, the SSB QCL index is used for indicating information of a QCL relationship of the SSB; there is an association relationship among the SSB position index, the SSB QCL index and the PRACH resource.

8. The method according to claim 7, wherein the information of the SSB comprises the SSB QCL index.

9. The method according to claim 8, wherein SSBs with a same SSB QCL index are associated with a same PRACH resource.

10. The method according to claim 8, wherein the SSB QCL index=Mod (the SSB position index, Q), wherein the Q is a maximum number of SSBs without a QCL relationship sent within a time window.

11. The method according to claim 10, wherein the Q is carried in system information or a demodulation reference signal (DMRS) of a physical broadcast channel (PBCH); or the Q is preconfigured.

12. The method according to claim 7, wherein the information of the PRACH preamble comprises an index of the PRACH preamble.

13. A terminal device, the terminal device comprising a processor and a memory, the processor is configured to store a computer program, the processor is configured to call and run the computer program stored in the memory to:

control an input interface to receive a physical downlink control channel (PDCCH), wherein the PDCCH comprises a physical random access channel (PRACH) resource indication information, the PRACH resource indication information comprises at least one of the following information: information of a PRACH resource, information of a synchronization signal block (SSB) associated with the PRACH resource, and information of a PRACH preamble transmitted on the PRACH resource; and determine, according to the PRACH resource indication information, the PRACH resource scheduled by a network device for the terminal device, and send a PRACH using the PRACH resource;

wherein the SSB has an SSB position index and a SSB quasi-co-located (QCL) index, and the SSB position index is used for indicating a position for sending the SSB in a candidate SSB position, the SSB QCL index is used for indicating information of a QCL relationship of the SSB; there is an association relationship among the SSB position index, the SSB QCL index and the PRACH resource.

14. The terminal device according to claim 13, wherein the information of the SSB comprises the SSB QCL index.

15. The terminal device according to claim 14, wherein SSBs with a same SSB QCL index are associated with a same PRACH resource.

16. The terminal device according to claim 14, wherein the SSB QCL index=Mod (the SSB position index, Q), wherein the Q is a maximum number of SSBs without the QCL relationship sent within a time window.

17. The terminal device according to claim 16, wherein the Q is carried in system information or a demodulation reference signal (DMRS) of a physical broadcast channel (PBCH); or the Q is preconfigured.

18. The terminal device according to claim 13, wherein the information of the PRACH preamble comprises an index of the PRACH preamble.

19. A network device, the network device comprising a processor and a memory, the memory is configured to store a computer program, the processor is configured to call and run the computer program stored in the memory to:

control an output interface to send a physical downlink control channel (PDCCH), wherein the PDCCH comprises physical random access channel (PRACH) resource indication information, the PRACH resource indication information comprises at least one of the following information: information of a PRACH resource, information of a synchronization signal block (SSB) associated with the PRACH resource, and information of a PRACH preamble transmitted on the PRACH resource; and control an input interface to receive a PRACH which is sent by the terminal device using the PRACH resource;

wherein the SSB has an SSB position index and a SSB quasi-co-located (QCL) index, and the SSB position index is used for indicating a position for sending the SSB in a candidate SSB position, the SSB QCL index is used for indicating information of a QCL relationship of the SSB; there is an association relationship among the SSB position index, the SSB QCL index and the PRACH resource.

20. The network device according to claim 19, wherein the information of the SSB comprises the SSB QCL index.

21. The network device according to claim 20, wherein SSBs with a same SSB QCL index are associated with a same PRACH resource.

22. The network device according to claim 20, wherein the SSB QCL index=Mod (the SSB position index, Q), wherein the Q is a maximum number of SSBs without a QCL relationship sent within a time window.

23. The network device according to claim 22, wherein the Q is carried in system information or a demodulation reference signal (DMRS) of a physical broadcast channel (PBCH); or the Q is preconfigured.

24. The network device according to claim 19, wherein the information of the PRACH preamble comprises an index of the PRACH preamble.

\* \* \* \* \*